United States Patent
Peng et al.

(10) Patent No.: US 11,942,821 B2
(45) Date of Patent: Mar. 26, 2024

(54) INJECTION MOLDING STEPPING MOTOR

(71) Applicant: Shanghai Moons' Electric Co., Ltd., Shanghai (CN)

(72) Inventors: Guangming Peng, Shanghai (CN); Wangxian Wu, Shanghai (CN); Jianjun Gan, Shanghai (CN)

(73) Assignee: SHANGHAI MOONS' ELECTRIC CO., LTD., Shanghai (CN)

( * ) Notice: Subject to any disclaimer, the term of this patent is extended or adjusted under 35 U.S.C. 154(b) by 255 days.

(21) Appl. No.: 17/760,753

(22) PCT Filed: Jan. 22, 2021

(86) PCT No.: PCT/CN2021/073271
§ 371 (c)(1),
(2) Date: Mar. 15, 2022

(87) PCT Pub. No.: WO2021/208554
PCT Pub. Date: Oct. 21, 2021

(65) Prior Publication Data
US 2022/0337101 A1    Oct. 20, 2022

(30) Foreign Application Priority Data
Apr. 14, 2020    (CN) .......................... 202010290862.8

(51) Int. Cl.
*H02K 37/04*    (2006.01)
*H02K 1/14*    (2006.01)
(Continued)

(52) U.S. Cl.
CPC ............. *H02K 1/148* (2013.01); *H02K 3/522* (2013.01); *H02K 5/08* (2013.01); *H02K 15/095* (2013.01); *H02K 15/12* (2013.01); *H02K 2213/03* (2013.01)

(58) Field of Classification Search
CPC ........ H02K 15/16; H02K 37/00; H02K 37/04; H02K 37/24
See application file for complete search history.

(56) References Cited

U.S. PATENT DOCUMENTS
4,107,559 A    8/1978    Patel

FOREIGN PATENT DOCUMENTS
CN    2669983 Y    1/2005
CN    201274447 Y    7/2009
(Continued)

OTHER PUBLICATIONS

International Search Report (with English translation) and Written Opinion issued in PCT/CN2021/073271, dated Apr. 14, 2021, 8 pages provided.

*Primary Examiner* — Ramon M Barrera
(74) *Attorney, Agent, or Firm* — HAMRE, SCHUMANN, MUELLER & LARSON, P.C.

(57) ABSTRACT

The present invention relates to an injection molding stepping motor, including an injection molding stator assembly and a rotor assembly, wherein the injection molding stator assembly includes a stator iron core, a front framework, a rear framework, a stator winding, a front lining ring, a rear lining ring and a mounting bracket, the stator winding is wound in a groove of the stator iron core into which the front framework and the rear framework are inserted, the front lining ring and the rear lining ring are mounted on two sides of the stator iron core, the stator iron core is fixed on the mounting bracket, and the front lining ring and the rear lining ring each adopts a structure which is formed by punching and laminating thin plates with different inner diameters. Compared with the prior art, the present invention has the advantages of reducing axial magnetic flux leakage of a motor and improving the moment of the motor.

10 Claims, 5 Drawing Sheets

(51) Int. Cl.
*H02K 3/52* (2006.01)
*H02K 5/08* (2006.01)
*H02K 15/095* (2006.01)
*H02K 15/12* (2006.01)

(56) References Cited

FOREIGN PATENT DOCUMENTS

| | | |
|---|---|---|
| CN | 202772742 U | 3/2013 |
| CN | 110829676 A | 2/2020 |
| EP | 0568347 A1 | 11/1993 |

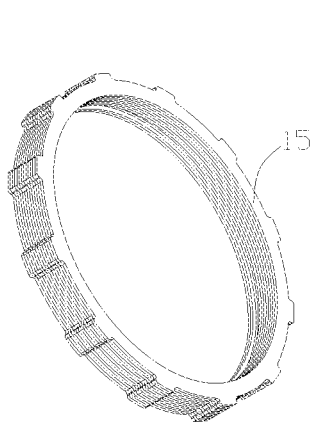 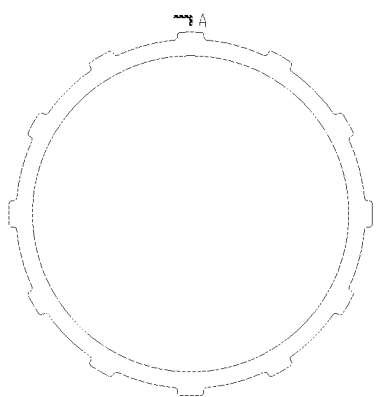 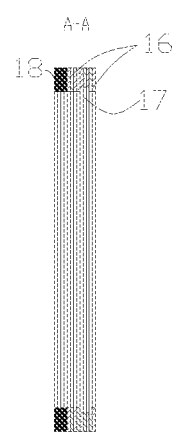
FIG. 7(a)      FIG. 7(b)      FIG. 7(c)
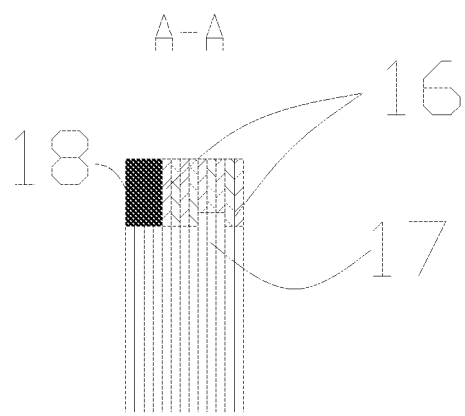
FIG. 8
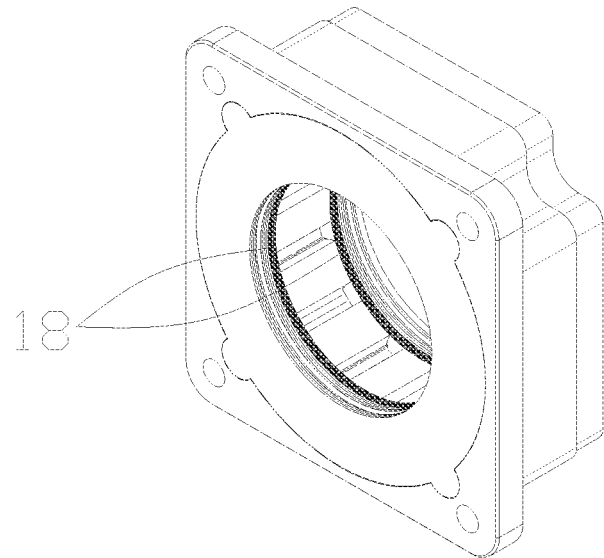
FIG. 9

INJECTION MOLDING STEPPING MOTOR

TECHNICAL FIELD

The present invention relates to a motor, and in particular, to an injection molding stepping motor.

BACKGROUND

An existing stepping motor includes an injection molding stator assembly 1, with a structure as shown in FIG. 1, wherein the injection molding stator assembly 1 includes a stator iron core 2, a front framework 3, a rear framework 4, a stator winding 5, a front lining ring 6, a rear lining ring 7 and a mounting bracket 8, as shown in FIG. 2, and the injection molding stator assembly 1 is formed by a mold through injection molding.

The motor is assembled by a motor stator assembly and a rotor assembly, the injection molding stator assembly 1 needs to process a groove at the front lining ring and the rear lining ring, and a retainer ring is placed in the groove for preventing the rotor from being removed from the motor due to the axial force.

The processed stator assembly 10 is as shown in FIG. 3, and the processed stator assembly 10 is provided with a stator groove 9.

In an existing design scheme, the groove for placing the retainer ring is processed after injection molding, so there are problems of difficult processing and tedious processes; meanwhile, in the existing scheme, during injection molding, the front lining ring and the rear lining ring are in direct contact with the stator iron core, so when the front lining ring and the rear lining ring are made of magnetic-conductive materials, the notch connection of the motor will lead to magnetic flux leakage, and the moment of the motor is reduced; and when the front lining ring and the rear lining ring are made of non-magnetic-conductive materials, the cost of the lining rings will lead to too high cost of the motor.

SUMMARY

An objective of the present invention is to overcome the defects in the prior art and provide an injection molding stepping motor.

The objective of the present invention may be achieved by the following technical solutions.

An injection molding stepping motor includes an injection molding stator assembly and a rotor assembly, wherein the injection molding stator assembly includes a stator iron core, a front framework, a rear framework, a stator winding, a front lining ring, a rear lining ring and a mounting bracket, the stator winding is wound in a groove of the stator iron core into which the front framework and the rear framework are inserted, the front lining ring and the rear lining ring are mounted on two sides of the stator iron core, the stator iron core is fixed on the mounting bracket, and the front lining ring and the rear lining ring each adopts a structure which is formed by punching and laminating thin plates with different inner diameters.

Preferably, the thin plates include a first thin plate and a second thin plate which have different inner diameters, and the first thin plate and the second thin plate are laminated for placing a retainer ring groove for preventing a rotor from being removed.

Preferably, the first thin plate and the second thin plate are thin plates made of stainless steel.

Preferably, the thin plates include a third thin plate, a fourth thin plate and a fifth thin plate, the third thin plate and the fifth thin plate have the same inner diameter, the inner diameter of the fourth thin plate is greater than that of the third thin plate, the fifth thin plate is arranged on a side closest to the stator iron core, the third thin plate is adjacently connected to the fifth thin plate, and the fourth thin plate is embedded in the third thin plate.

Preferably, the fifth thin plate is a thin plate made of a non-magnetic-conductive material, and the third thin plate and the fourth thin plate adopt iron plates.

Preferably, the non-magnetic-conductive material is stainless steel.

Preferably, the laminating thickness of the fifth thin plate is 1-2 mm.

Preferably, high-temperature resistant plastic or insulating paper is added to one side of the stator iron core.

Preferably, the thickness of the plastic or insulating paper is 0.5-2 mm.

Preferably, the front framework or the rear framework adopt a new framework, the new framework is provided with an extension portion in a radial direction, and the extension portion is used to cover a tooth portion of the stator iron core.

Compared with the prior art, the present invention has the following advantages:

1) groove processing after injection molding is avoided through lamination of the thin plates with different inner diameters, so that the axial magnetic flux leakage of the motor is reduced, and the moment of the motor is improved; and 2) the use of the non-magnetic-conductive material of the lining ring of the motor is reduced, and the cost of the motor is reduced.

BRIEF DESCRIPTION OF DRAWINGS

FIG. 7(a) is a three-dimensional structural schematic diagram of a lining ring of an embodiment 2;

FIG. 7(b) is a schematic diagram of a front view structure of a lining ring according to an embodiment 2;

FIG. 7(c) is a schematic section view of an A-A direction of FIG. 7(b);

FIG. 8 is a structural diagram of a partially enlarged structure of FIG. 7(c);

FIG. 9 is a structural schematic diagram of an assembled injection molding stator assembly according to an embodiment 2;

FIG. 12(*b*) is a three-dimensional structural schematic diagram of a new framework according to an embodiment 4;

Figure 1:
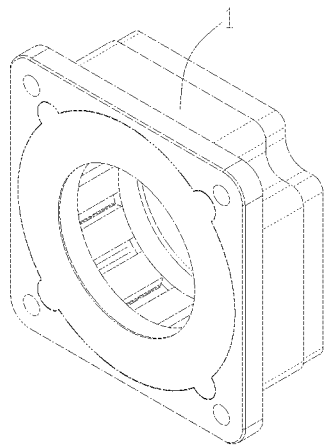
FIG. 1 is a structural schematic diagram of an injection molding stator assembly of an existing injection molding stepping motor.
Figure 2:
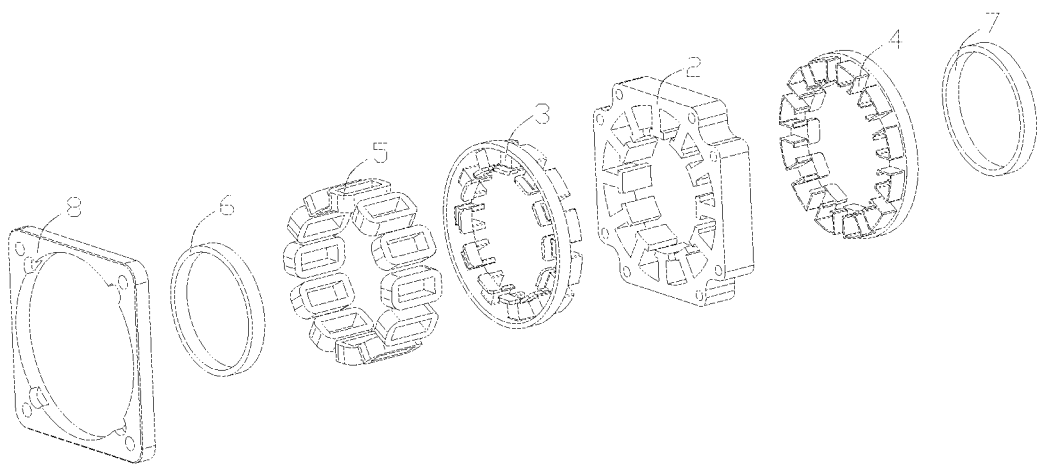
FIG. 2 is a schematic diagram of a breakdown structure of an injection molding stator assembly of an existing injection molding stepping motor.
Figure 3:
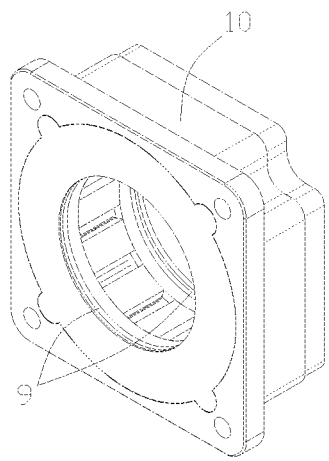
FIG. 3 is a structural schematic diagram of a processed injection molding stator assembly of an existing injection molding stepping motor.

In the drawings, 1 is injection molding assembly, 2 is stator iron core, 3 is front framework, 4 is rear framework, 5 is stator winding, 6 is front lining ring, 7 is rear lining ring, 8 is mounting bracket, 9 is processed stator groove, 10 is processed stator assembly, 11 is first steel sleeve, 12 is first thin plate, 13 is second thin plate, 14 is retainer ring groove, 15 is second steel sleeve, 16 is third thin plate, 17 is fourth thin plate, 18 is fifth thin plate, 19 is plastic or insulating paper, 20 is new framework, 21 is extension portion, 22 is tooth portion of the stator iron core, 23 is inner groove, 24 is lining ring in the embodiment 4, and 25 is injection molding stator assembly in the embodiment 4.

DETAILED DESCRIPTION OF EMBODIMENTS

The technical solutions in embodiments of the disclosure are described clearly and completely below with reference to the accompanying drawings in the embodiments of the disclosure. Obviously, the described embodiments are merely a part of embodiments of the disclosure and not all the embodiments. Based on the embodiments of the present invention, all of other embodiments obtained by a person of ordinary skill in the art without any creative effort shall belong to the protection scope of the present invention.

Embodiment 1

Figure 4A:
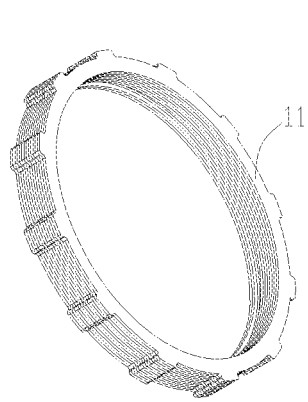
FIG. 4(a) is a three-dimensional structural schematic diagram of a lining ring according to an embodiment 1.
Figure 4B:
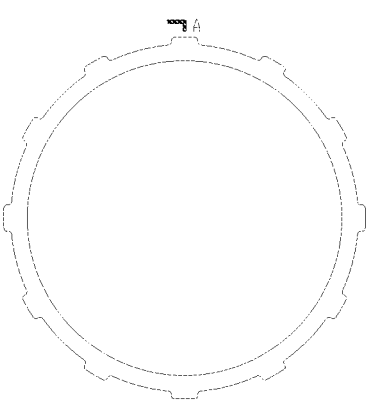
FIG. 4(b) is a schematic diagram of a front view structure of a lining ring according to an embodiment 1.
Figure 4C:
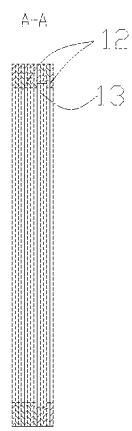
FIG. 4(c) is a schematic section view of an A-A direction of FIG. 4(b)
Figure 5:
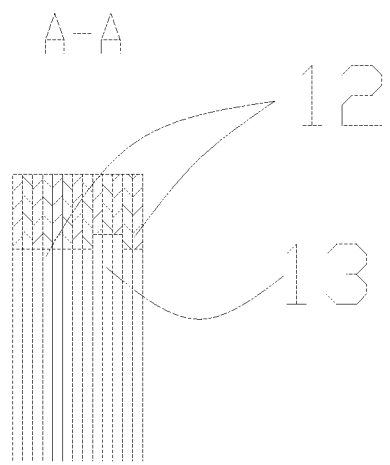
FIG. 5 is a structural diagram of a partially enlarged structure of FIG. 4(c)
Figure 6:
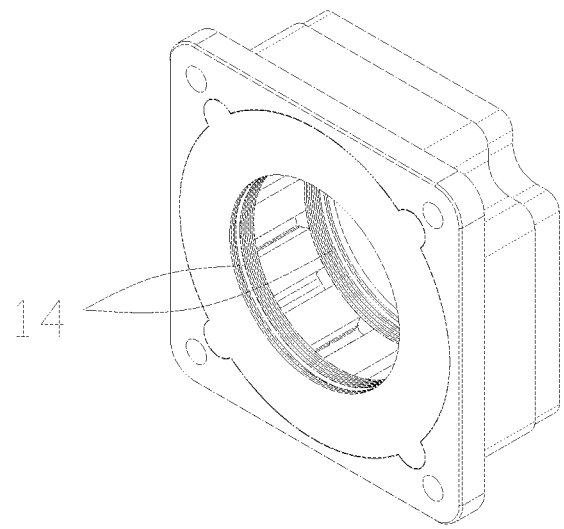
FIG. 6 is a structural schematic diagram of an assembled injection molding stator assembly according to an embodiment 1.

An injection molding stepping motor provided by the present invention includes an injection molding stator assembly 1 and a rotor assembly, wherein the injection molding stator assembly 1 includes a stator iron core 2, a front framework 3, a rear framework 4, a stator winding 5, a front lining ring 6, a rear lining ring 7 and a mounting bracket 8, the stator winding 5 is wound in a groove of the stator iron core into which the front framework and the rear framework are inserted, the front lining ring 6 and the rear lining ring 7 are mounted on two sides of the stator iron core 2, the stator iron core 2 is fixed on the mounting bracket 8, and the front lining ring 6 and the rear lining ring 7 each adopts a structure which is formed by punching and laminating thin plates with different inner diameters, as shown in FIG. 4 to FIG. 6.

The thin plates include a first thin plate 12 and a second thin plate 13 which have different inner diameters, and the first thin plate 12 and the second thin plate 13 are laminated for placing a retainer ring groove 14 for preventing a rotor from being removed. In order to avoid the magnetic flux leakage of the motor and improve the strength of the motor, the thin plate materials for punching the front lining ring and the rear lining ring of the motor are stainless steel.

Embodiment 2

As shown in FIG. 7 to FIG. 8, the designed front and rear lining rings are also formed by punching and laminating thin plates, wherein the thin plates include a third thin plate 16, a fourth thin plate 17 and a fifth thin plate 18, the third thin plate 16 and the fifth thin plate 18 have the same inner diameter, the inner diameter of the fourth thin plate 17 is greater than that of the third thin plate 16, the fifth thin plate 18 is arranged on a side closest to the stator iron core 2, the third thin plate 16 is adjacently connected to the fifth thin plate 18, and the fourth thin plate 17 is embedded in the third thin plate 16.

Preferably, the fifth thin plate 18 is a thin plate made of a non-magnetic-conductive material, and the third thin plate and 16 and the fourth thin plate 17 adopt iron plates. The laminating thickness of the fifth thin plate 18 is 1-2 mm. When a second steel sleeve 15 is mounted, the end of the non-magnetic-conductive material 18 is mounted on an inner side of the stator to be in contact with the stator iron core of the motor.

The mounting position of the lining ring is shown in FIG. 9.

Embodiment 3

Figure 10:
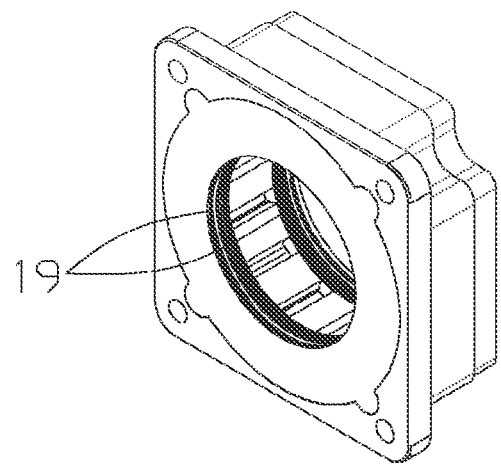
FIG. 10 is a structural schematic diagram of an injection molding stator assembly according to an embodiment 3.

The front and rear lining rings adopt the lining ring in the embodiment 1 or the embodiment 2, but high-temperature resistant plastic or insulating paper 19 is added to one side of the injection molding stator assembly close to the stator iron core, as shown in the FIG. 10, the thickness is 0.5-2 mm.

Embodiment 4

Figure 11:
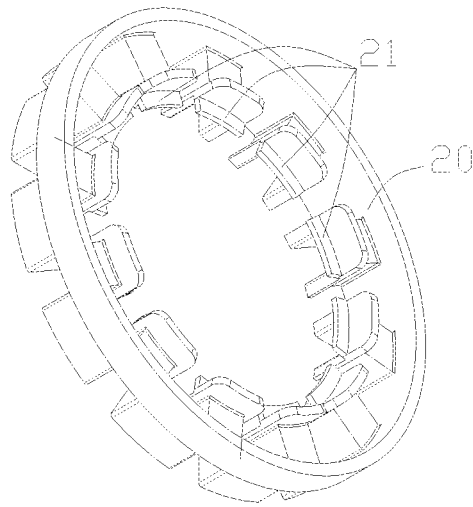
FIG. 11 is a structural schematic diagram of a new framework according to an embodiment 4.

FIG. 11 designs a new frame 20, the framework is provided with an extension portion 21 in a radial direction, and the extension portion 21 covers a tooth portion of the stator.

Figure 12A:
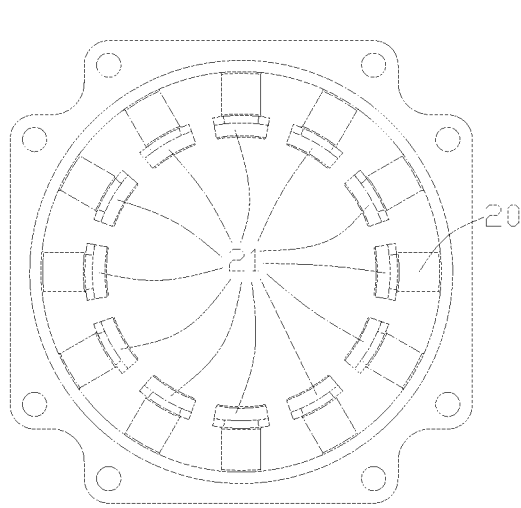
FIG. 12(*a*) is a schematic diagram of a front view structure of a new framework according to an embodiment 4.
Figure 12B:
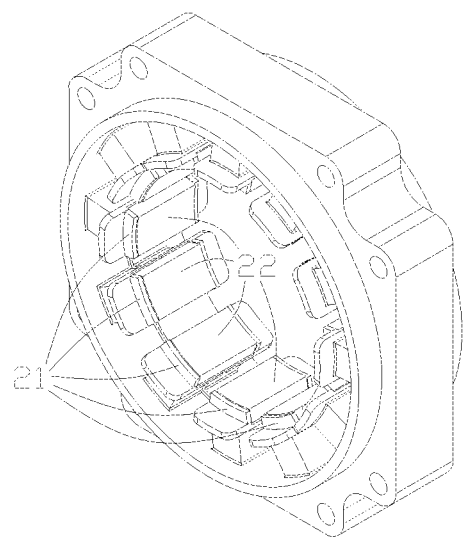

The assembling diagram of the stator iron core (the winding is not shown) and the framework is shown in FIG. 12, the radial extension portion of the framework covers the tooth portion 22 of the stator iron core of the motor.

Figure 13:
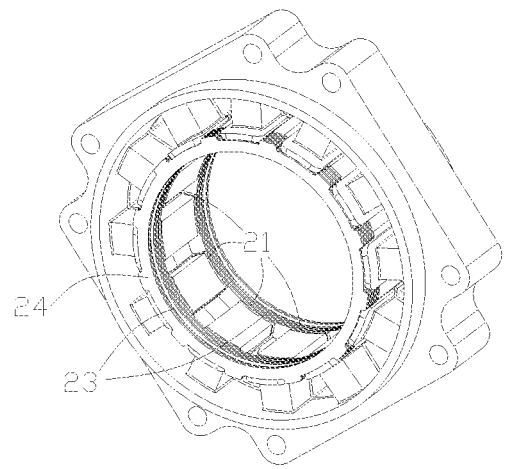
FIG. 13 is an assembling schematic diagram of a stator iron core, a framework and a steel sleeve according to an embodiment 4.
Figure 14:
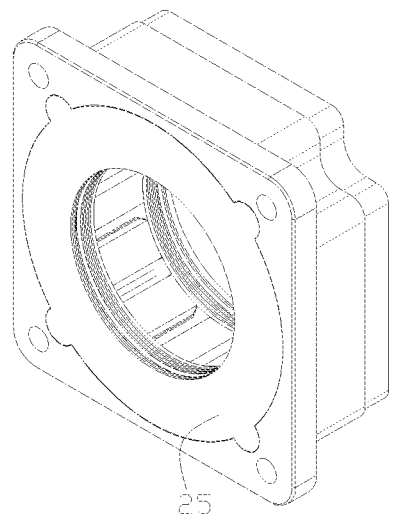
FIG. 14 is a schematic diagram of an assembled structure according to an embodiment 4.

The assembling diagram of the assembling diagram of the stator iron core (the winding is not shown), the framework and the steel sleeve are shown in FIG. 13, the lining ring 24 in the embodiment 1 or the embodiment 2 is adopted, as shown in FIG. 13, the groove 23 is present, and the injection molding stator 25 is shown in FIG. 14.

The above merely describes specific embodiments of the present invention, but the protection scope of the disclosure is not limited thereto. Any person skilled in the art may easily conceive equivalent modifications or substitutions within the technical scope of the disclosure, and these modifications or substitutions shall fall within the protection scope of the disclosure. Therefore, the protection scope of the present invention should be determined with reference to the appended claims.

The invention claimed is:

1. An injection molding stepping motor, comprising an injection molding stator assembly and a rotor assembly, wherein the injection molding stator assembly comprises a stator iron core, a front framework, a rear framework, a stator winding a front lining ring, a rear lining ring- and a mounting bracket, the stator winding is wound in a groove of the stator iron core into which the front framework and the rear framework are inserted, the front lining ring and the rear lining ring are mounted on two sides of the stator iron core, the stator iron core is fixed on the mounting bracket, and the front lining ring and the rear lining ring each adopts a structure which is formed by punching and laminating thin plates with different inner diameters.

2. The injection molding stepping motor according to claim 1, wherein the thin plates comprise a first thin plate and a second thin plate which have different inner diameters, and the first thin plate and the second thin plate are laminated for placing a retainer ring groove for preventing a rotor from being removed.

3. The injection molding stepping motor according to claim 2, wherein the first thin plate and the second thin plate are thin plates made of stainless steel.

4. The injection molding stepping motor according to claim 1, wherein the thin plates comprise a third thin plate, a fourth thin plate and a fifth thin plate, the third thin plate and the fifth thin plate have the same inner diameter, the inner diameter of the fourth thin plate is greater than that of the third thin plate, the fifth thin plate is arranged on a side closest to the stator iron core, the third thin plate is adjacently connected to the fifth thin plate, and the fourth thin plate is embedded in the third thin plate.

5. The injection molding stepping motor according to claim 4, wherein the fifth thin plate is a thin plate made of a non-magnetic-conductive material, and the third thin plate and the fourth thin plate adopt iron plates.

6. The injection molding stepping motor according to claim 5, wherein the non-magnetic-conductive material is stainless steel.

7. The injection molding stepping motor according to claim 4, wherein the laminating thickness of the fifth thin plate is 1-2 mm.

8. The injection molding stepping motor according to claim 2, wherein high-temperature resistant plastic or insulating paper is added to one side of the stator iron core.

9. The injection molding stepping motor according to claim 8, wherein the thickness of the plastic or insulating paper is 0.5-2 mm.

10. The injection molding stepping motor according to claim 2, wherein the front framework or the rear framework adopt a new framework, the new framework is provided with an extension portion in a radial direction, and the extension portion is used to cover a tooth portion of the stator iron core.

* * * * *